United States Patent [19]
Lapitsky et al.

[11] 3,874,251
[45] Apr. 1, 1975

[54] BEVEL GEAR DIFFERENTIAL

[76] Inventors: Igor Nikolaevich Lapitsky, ulitsa B. Khmelnitskogo 51, kv. 46; Bogdan Vasilievich Sabadakh, ulitsa Plekhanova 3a, kv. 23; Gennady Grigorievich Sumtsov, ulitsa Ya. Kolasa 50, korpus 2, kv. 42; Ivan Pavlovich Xenevich, ulitsa O. Koshevogo 13, kv. 6; Anatoly Tikhonovich Skoibeda, ulitsa Tolbukhina, 23, kv. 60; Leonid Isaakovich Venzel, ulitsa Sovkhoznaya, 25, kv. 1; Viktor Sergeevich Tolstoguzov, ulitsa Koltsova 4, korpus 2, kv. 75; Boris Yakovlevich Shneiser, ulitsa Gritsevtsa, 13, kv. 31; Alexandr Viktorovich Korolkevich, ulitsa Ya. Rainisa 19, kv. 35, all of Minsk, U.S.S.R.

[22] Filed: May 15, 1973

[21] Appl. No.: 360,475

[52] U.S. Cl. .................................. 74/713, 74/710
[51] Int. Cl. ......................... F16h 1/40, F16h 1/44
[58] Field of Search .......................... 74/710, 713

[56]  References Cited
UNITED STATES PATENTS

| | | | |
|---|---|---|---|
| 702,742 | 6/1902 | Saxon | 74/713 |
| 1,324,860 | 12/1919 | Taylor | 74/713 X |
| 1,431,572 | 10/1922 | Dodge | 74/713 |
| 1,438,313 | 12/1922 | Kollman | 74/713 X |
| 1,446,545 | 2/1923 | Brush et al | 74/713 X |
| 1,450,210 | 4/1923 | Hazelton | 74/713 |
| 1,461,102 | 7/1923 | Sternbergh | 74/713 |
| 2,774,253 | 12/1956 | Minard et al. | 74/713 X |
| 2,924,125 | 2/1960 | Brandon | 74/713 |
| 3,624,717 | 11/1971 | Brubaker | 74/713 X |
| 3,673,889 | 7/1972 | Hauser | 74/713 |

FOREIGN PATENTS OR APPLICATIONS

| | | | |
|---|---|---|---|
| 329,170 | 5/1930 | United Kingdom | 74/713 |

*Primary Examiner*—Samuel Scott
*Assistant Examiner*—P. S. Lall
*Attorney, Agent, or Firm*—Waters, Roditi, Schwartz & Nissen

[57]  ABSTRACT

A differential having bevel satellites which are in constant mesh with bevel pinions of output shafts, the outer end faces of said bevel satellites being engaged with the inner surface of a ring member disposed outside (or inside) of a differential casing. This ring member is movable in a plane normal to the rotational axes of the differential casing and is prevented from shifting relative to the differential casing along the rotational axes thereof.

The ring member so positioned ensures counter-balancing of the thrust acting upon the satellites and of specific pressures developed in the zone of the engagement between the bevel pinions and satellites.

8 Claims, 13 Drawing Figures

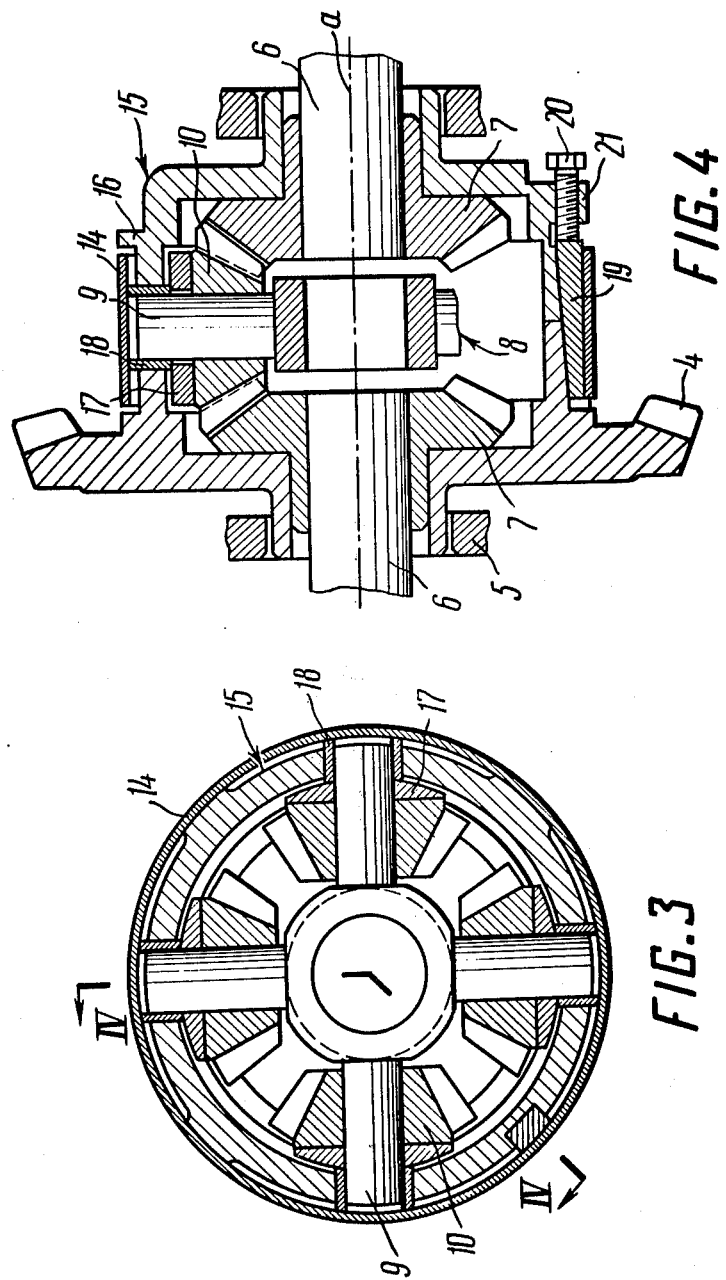

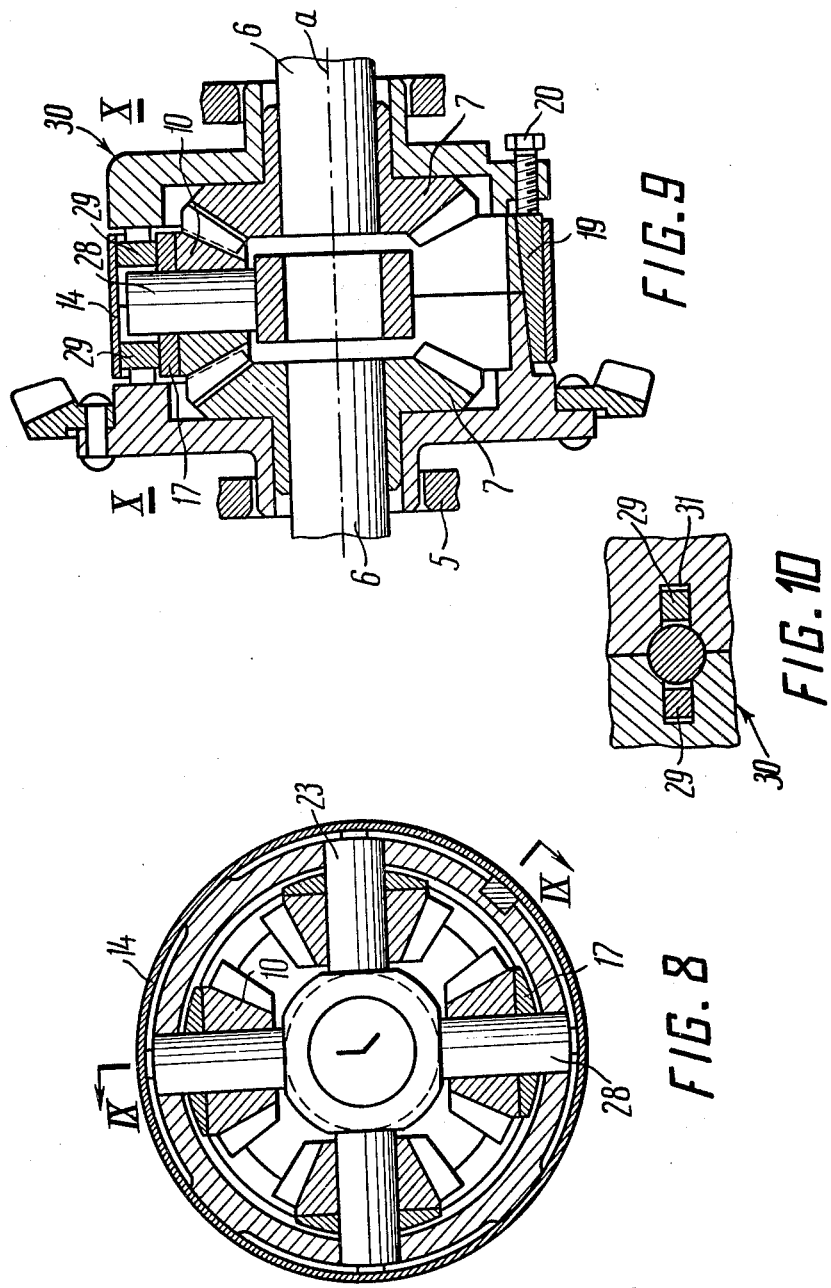

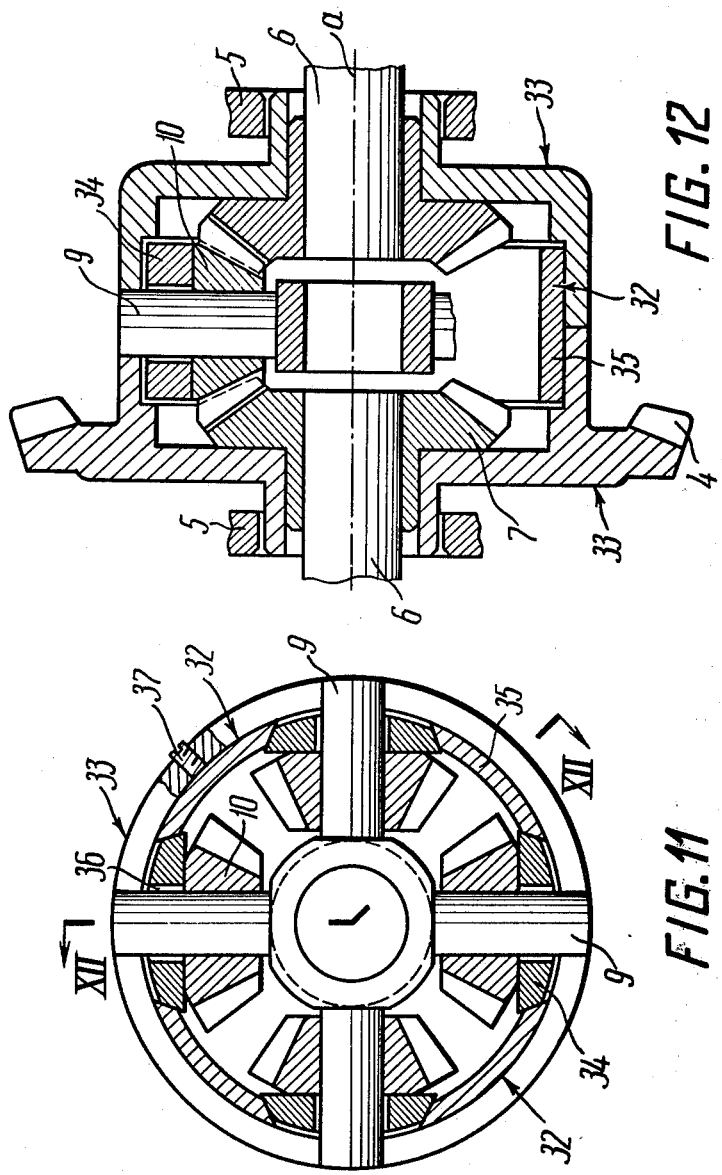

BEVEL GEAR DIFFERENTIAL

This invention relates to the field of mechanical engineering and, more particularly, to bevel gear differentials.

Bevel gear differentials made in accordance with the present invention may be used most efficiently in wheeled vehicles such as tractors, automobiles, etc.

Bevel gear differentials having a differential casing with an outer pinion thereof being operatively interconnected with driving means are well known.

The differential casing is made of two rigidly interconnected parts. The split plane of the parts is normal to the rotational axes of the differential casing. A spider mounted inside the casing is lying in the split plane of the casing, the radially disposed axles of the spider being rigidly interconnected and fixed to the casing thereby rotating with the latter. Bevel satellites mounted at the ends of the radially disposed axles are in constant mesh with the bevel pinions fixed to output shafts. The output shafts are coaxial and concentric with respect to each other and journaled in the differential casing.

Rigidly fixed in the differential casing is a ring member engaging the outer end faces of the bevel satellites. This ring member is adapted to prevent the satellites from shifting outwardly along the radially disposed axles.

During rotation of the differential casing the satellies are subjected to the shifting forces acting in the direction of the radially disposed axles.

Under the action of these forces the satellites are normally held in constant engagement of their outer end faces with the inner surface of the ring member.

With the ring member being rigidly fixed to the casing, the satellites are restrained from movement in the axial direction. Manufacturing inaccuracies and improper assemblying result in nonuniform distribution of pressures acting upon teeth of bevel pinions and satellites which in turn leads to excessive wear and hence to shortenning the lifetime of the differential as a whole.

Also known in the art are bevel gear differentials, wherein opposite satellites are mounted in pairs on common axes and restrained from moving outwardly by means of blocks rigidly fixed to the axles. Said satellites along with the axles are freely movable in parallel and perpendicular directions with respect to the axes of the pinions mounted on the output shafts along the guide surfaces provided in the differential casing, said guide surfaces being parallel to the axes of the output shafts.

Due to the fact that in differentials of the above described type the opposite sattelites are in pairs fixed on coaxial axles movable with respect to each other, one pair of the satellites may be loaded in greater degree than the other one.

Also known in the art are bevel gear differentials having satellites mounted at radially disposed axles of a spider rigidly connected to the differential casing. A ring member is formed inside the differential casing integrally therewith, said ring being engaged with the outer end faces of the satellites which are in constant mesh with pinions fixed to output shafts.

The above-mentioned output shafts are located coaxially and concentrically with respect to each other and the opposite ends thereof are interconnected by means of a floating shaft passing through an opening provided in the spider, said floating shaft being connected to the spider through frictional means and journalled in adjacent ends of the output shafts be means of needle bearings.

The differentials of the above-described type are complex in manufacture and only partially solves the problem presented by nonuniform distribution of pressures acting upon teeth of the bevel pinions and satellites.

Also known in the art are bevel gear differentials having bevel gears fixed to output shafts and meshed with satellites. These satellites are mounted on radially disposed axles rigidly fixed in the differential casing. In order to ensure more uniform distribution of pressures acting upon teeth of satellites and bevel pinions, sealed resilient chambers are defined between the end faces of the satellites and the differential casing, said chambers being filled with liquid and communicated to each other.

The differentials of the above-described type are difficult in manufacture and lead to increase in overall dimensions of the differential casing which is dictated by disposition of the liquid-filled sealed resilient chambers inside said casing.

It is an object of the present invention to provide more uniform distribution of pressures acting upon teeth of satellites and bevel pinions.

Another object of this invention is to prolong the lifetime of differentials.

With these and other objects in view, a bevel gear differential is provided, wherein a ring member adjoining a differential casing and engaging the outside end faces of satellites is mounted so as to ensure counter-balancing between the thrust acting upon the satellites and the forces acting from bevel pinions upon each of the satellites.

The above objects are attained by providing a bevel gear differential comprising a driving rotatable differential casing accommodating a spider which is rotatable therewith, the spider being provided with a group of radially disposed axles with bevel satellites mounted at the ends thereof and being in constant mesh with bevel pinions fixed to the adjacent ends of coaxially and concentrically disposed output shafts journaled in the differential casing, a ring member adjoining the differential casing and preventing the bevel satellites from shifting outwardly along the radially disposed axles thereof, the inner surface of said ring member being in engagement with the other end faces of the bevel satellites during rotation of the differential casing. According to the present invention, the ring member is movable in a plane normal to the rotational axis of the differential casing and is prevented from shifting relative to the differential casing along the rotational axis thereof, so as to ensure counter-balancing of the thrust acting upon the satellites and of specific pressures developed in the zone of the engagement between the bevel pinions and the satellites.

It is advantageous to place the ring member inside the differential casing and to insert bearing washers into the space between the differential casing and the associated end faces in order to ensure the engagement of the ring member with the outer end faces of the satellites, said washers being movable along the radially disposed axles.

It is expedient to equip the differentials with such ring members, which have been produced and manufactured in serial production, thereby increasing the life-time of these differentials.

It is also advisable to make the ring member flexible and to place it on the outside surface of the differential casing, the engagement of the ring member with the outside end faces being accomplished via bearing washers and inserts movable along the radially disposed axles.

It is obvious that such ring members should advantageously be incorporated in newly designed differentials.

It is most advantageous to place longitudinally adjustable wedge member between the ring member and the differential casing to provide for adjustment of the working depth of teeth in mesh of the satellites with the bevel pinions.

It is good practice to make each insert in the form of parallelepiped movable in the differential casing in the direction parallel to the rotational axis thereof, the opposite radially disposed axles being in pairs rigidly interconnected while being possible to be shifted both axially and angularly in the appropriated planes passing through the rotational axis of the differential casing.

It is also advisable, in case if radially disposed axles of the spider are rigidly interconnected, to make each insert in the form of two bars arranged on opposite sides of the respective radially disposed axle.

The parallelepiped or bar form of the inserts makes it possible to achieve the most uniform distribution of forces acting between the satellites and the bevel pinions.

It has been revealed that the ring member preferably should be placed inside the casing and made with splits, the ring member comprising wedge-shaped parts with some of these parts engaging the outside end faces of the satellites and facing these end faces with the enlarged sides thereof, while the others of the parts of the ring member being placed therebetween and adjoining their enlarged sides to the inner surface of the differential casing, those of parts of the ring member engaging the satellites being able to be radially and tangentially shifted in differential casing with respect to the rotational axis thereof.

It has been further found that it is advantageous to provide the differential casing with a screw mechanism to adjust the working depth of feeth in mesh between the satellites and the bevel pinions, said mechanism being engaged with that part of the ring member which is disposed between other parts contacting the adjacent satellites.

The split form of the ring member makes it possible to attain more uniform distribution of the thrust acting from the bevel pinions upon the satellites.

The bevel gear differential made in accordance with the present invention ensures by the most simple means substantially uniform distribution of pressures acting between teeth of the satellites and the bevel pinions, thereby increasing the life-time of the differential.

The invention will now be explained in greater detail with reference to embodiments thereof which are represented in the accompanying drawing, wherein:

FIG. 3 is a cross-sectional view of a bevel gear differential according to the invention, wherein the ring member is disposed on the outside surface of the differential casing;

FIG. 4 is a sectional view taken along the lines IV—IV of FIG. 3;

FIG. 8 is a cross-sectional view of a differential made in accordance with the present invention with the bar-shaped inserts;

FIG. 9 is a sectional view taken along the lines IX—IX of FIG. 8;

FIG. 10 is a sectional view taken along the lines X—X of FIG. 9;

FIG. 11 is a cross-sectional view of a differential made, according to the invention, with a split ring member;

FIG. 12 is a sectional view taken along the lines XII—XII of FIG. 11;

Figure 2:
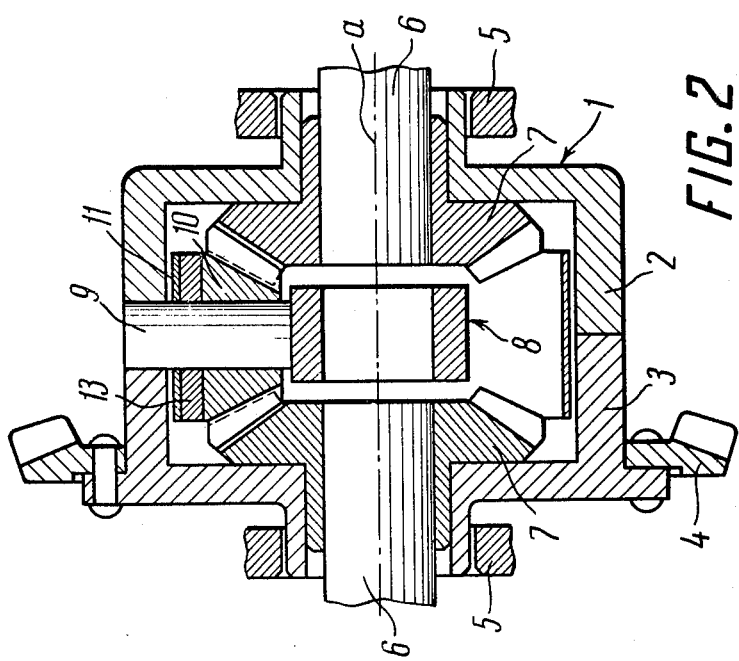
FIG. 2 is a sectional view along the lines II—II of FIG. 1.
Figure 1:
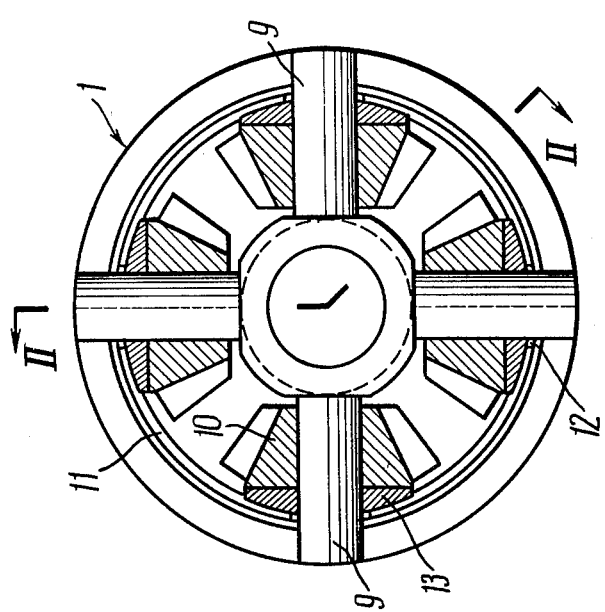
FIG. 1 is a cross-sectional view of a bevel gear differential made in accordance with the present invention with a ring member disposed inside a differential casing.

A differential comprises a differential casing 1 (FIGS. 1 and 2) formed of two halves 2 and 3 with a pinion 4 attached to the part 3. This pinion is adapted to connect the differential casing 1 to a driving mechanism (not shown in the drawing). The casing 1 is journalled in a housing 5.

Two output shafts 6 disposed coaxially and concentrically with respect to each other are rotatably mounted in the housing 5. The inner ends of these shafts are disposed adjacently inside the differential casing. Bevel pinions 7 are splined to said ends of the shafts.

A spider 8 is arranged in the differential casing between the bevel pinions 7, this spider being provided with radially disposed axles 9 rigidly connected to each other and to the casing 1. Bevel satellites 10 rotatably mounted on said axles and may be axially shifted therealong. The satellites are in constant mesh with the bevel pinions 7.

A ring 11 is freely mounted in the differential casing 1 close to the inner surface thereof. Openings 12 are provided in the ring 11 loosely fitting the radially disposed axles 9 passing through the ring.

The ring 11 is so disposed as to ensure a slight clearance between the outer periphery of the ring and the inner surface of the casing 1. The inner surface of the ring adjoining the outer end faces of the satellites 10 comes into engagement therewith during rotation of the differential casing. The clearance maintained between the inner surface of the casing 1 and the outer periphery of the ring 11 makes it possible for the ring 11 to be shifted in a plane normal to geometrical rotational axis $a$ of this casing.

The inner sidewalls of the openings 12 in the ring 11 prevent the ring from shifting it with respect to the axles 9 and hence with respect to differential casing 1 along rotational axis $a$ thereof.

Bearing washers 13 are placed between the ring 11 and the outer end faces of the satellites 10. These washers are movable along the radially disposed axles 9 and adapted to ensure engagement between the outer end faces of the satellites and the ring 11.

The bearing washers may be made integrally with the ring.

It is possible to arrange a ring 14 (FIGS. 3 and 4) on the outside surface of a differential casing 15. The ring 14 is flexible to increase its sensibility to forces acting upon this ring from the side of the outer end faces of the satellites 10. Stops 16 are provided on the casing to limit the shift of the ring with respect to the casing. The engagement of the ring 14 with the outer end faces of the satellites is accomplished by means of bearing washers 17 and inserts 18. Said bearing washers and inserts are movable along the radially disposed axles 9 and also movable with respect to the casing 15 in the direction normal to the rotational axis $a$ of the casing.

To adjust the working depth of teeth in mesh of the satellites 10 with the bevel pinion 7, a wedge 19 is provided, said wedge being disposed between the ring 14 and the differential casing 15. The wedge extends along the casing 15 and may be shifted in this direction by means of a bolt 20 screwed into the threaded opening provided in a projection 21 of the casing 15.

Figure 6:
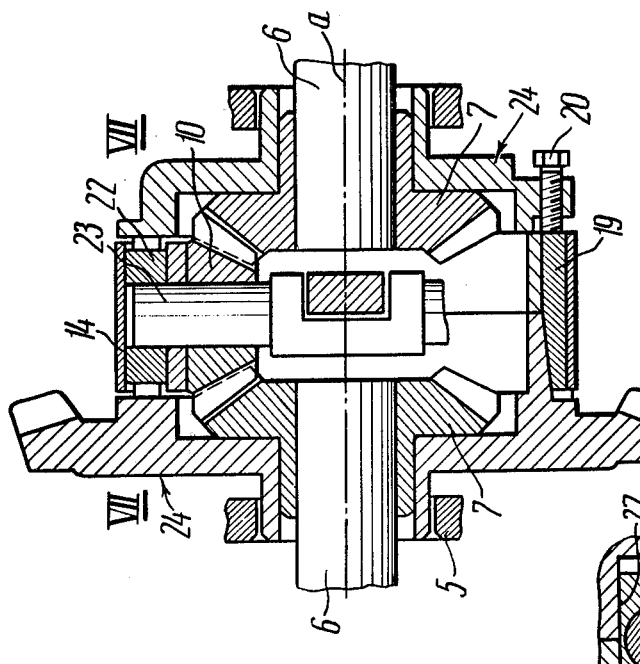
FIG. 6 is a sectional view taken along the lines VI—VI of FIG. 5.
Figure 7:
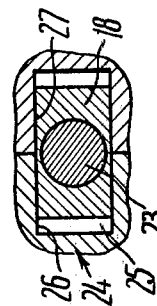
FIG. 7 is a sectional view taken along the lines VII—VII of FIG. 6.
Figure 5:
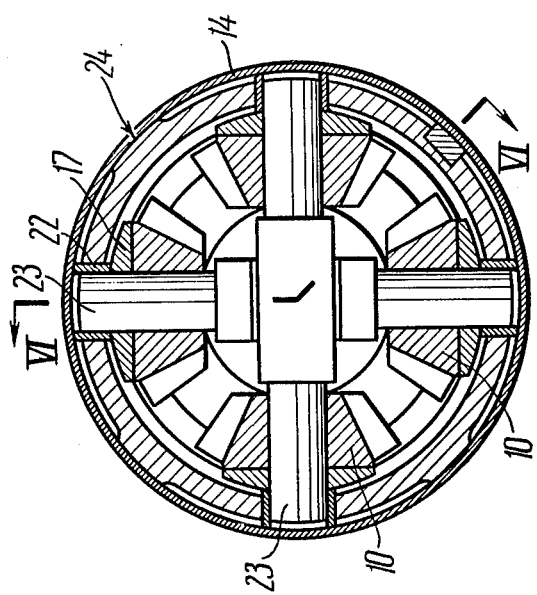
FIG. 5 is a sectional view of a differential made accordaning to the present invention, with inserts in the form of parallelepipeds.

To ensure more uniform distribution of forces acting upon each of satellites 10 from the bevel pinions 7, inserts 22 (FIGS. 5, 6 and 7) may have a form of parallelepipeds. These inserts are axially movable along radially disposed axles 23.

Guide grooves 25 are made in a differential casing 24. Guiding surfaces 26 of these grooves are parallel to the plane passing through rotational axis $a$ of the differential casing 24 and the associated radially disposed axles 23. The grooves accommodate the inserts 22, the opposite surfaces 27 of the inserts being arranged along the guide surfaces 26.

The inserts adapted to be moved between the guide surfaces 26 in parallel and normal directions with respect to rotational axis $a$ of the differential casing 24.

The opposite radially disposed axles 23 are in pairs rigidly interconnected. The pairs of the axles so formed are disposed with a gap in the point of their intersection, this gap ensuring their axial and angular shift in the differential casing 24 with respect to each other in the respective planes passing through rotational axis $a$ of the differential casing.

Radially disposed axles 28 (FIGS. 8, 9 and 10) should be rigidly interconnected in order to reduce effect of impacts acting upon teeth of the bevel pinions 7 of the differential working with transmission of considerable dynamic forces of variable sign. In ths embodiment each of the inserts comprises two bars 29 disposed at opposite sides with respect to the associated radially disposed axle 28 and extended along rotational axis $a$ of a differential casing 30. These bars are placed in openings 31 provided in the differential casing 30 and permitting a limited shift of the bars in the direction normal to rotational axis $a$ of the differential casing.

For the sake of simplicity the flexible ring may be made of a band with the ends of this band being fixed to the outside surface of the differential casing at the point located between two adjacent satellites.

A ring 32 (FIGS. 11 and 12) may have a splitted form and may be disposed inside a differential casing 33. This ring consists of wedge-shaped parts 34 and 35. Some of these parts 34 engage the outside end faces of the satellites 10 and confront these end faces with their enlarged sides while the other parts 35 are disposed between the parts 34 and have the enlarged sides adjoining the inner surface of the differential casing 33.

To ensure radial and tangential shift of the parts 34 with respect to the differential casing 33, the axles 9 are loosely fitted in openings 36 provided in said parts. Clearances are also maintained between the parts 34 and the inner surface of the differential casing 33.

In order to adjust working depth of teeth in mesh between the satellites 10 and the bevel pinions 7, a threaded opening with a screw 37 is provided in the differential casing 33. This screw is perpendicular to rotational axis $a$ of the differential casing and engages one of the parts 35 of the ring 32.

The bevel gear differential operates as follows.

Torque is transmitted to the casing 1 from a driving mechanism (not shown in the drawing) through the pinion 4.

The rotation is further transmitted from the casing 1 through the axles 9 of the spider 8 and the satellites 10 mounted on these axles to the bevel pinions 7 and hence to the output shafts 6 connected thereto. During the transmission of the torque to the putput shafts 6 thrust is developed in mesh of the bevel pinions 7 with the satellites 10, this thrust acting upon the satellites. Under the action of these forces the outer end faces of the satellites 10 are held in constant engagement with the inner surface of the ring 11 via the bearing washers 13.

When the ring 11 disposed inside the differential casing 1 is made rigid, non-uniform distribution of pressures acting from the bevel pinions 7 onto the satellites 10 cause the more loaded satellites to shift the ring 11 in the plane normal to rotational axis $a$ of the differential casing 1 toward the resultant of forces acting upon the ring 11 until equilibrium is established.

During the shifting of the ring 11 those of satellites 10 which are loaded in more degree are moved outwardly of the rotational axes of the bevel pinions 7 while the satellites which are loaded in less degree are moved toward these axes under the action of the ring 11. Upon the outward movement of the satellites 10 with respect to said axes, the pressure acting upon the satellites from the bevel pinions 7 is decreased while upon the movement in opposite direction the pressure is increased thereby ensuring the equalization of forces acting from the bevel pinions 7 upon the satellites 10.

In case when the ring 11 disposed inside the differential casing 1 is made flexible, the operation follows in the similar way except that the satellites 10 are adapted to have an additional amount of shifting due to elastic deformations of the ring 11.

Figure 13:
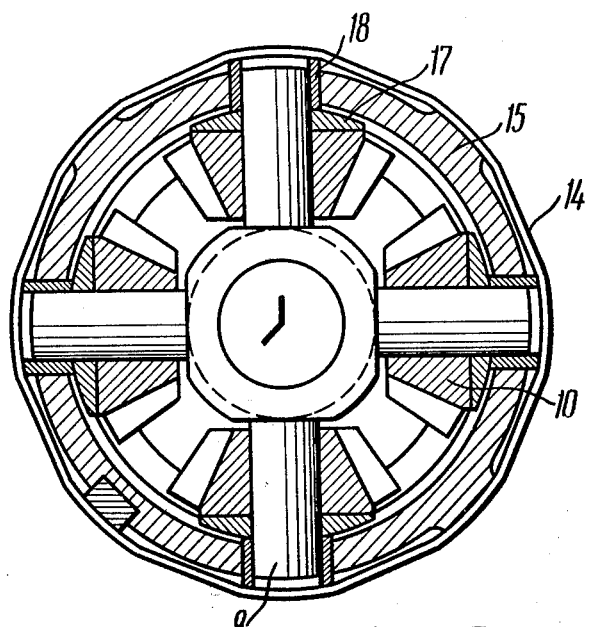
FIG. 13 is a view of a differential with the ring member disposed on the outside surface of the differential casing, the ring member being shown in the working condition of the differential.

In the embodiment where the ring 14 is flexible and mounted on the outer surface of the differential casing 15 the equilization of pressures acting from the bevel pinions 7 upon the satellites 10 is accomplished due to the fact that the ring 14 when deformed (FIG. 13) takes the form of a polygon with uniform distribution of tensile forces acting along the sides thereof.

When the differential is made with the inserts 18 having the form of parallelepipeds, it is possible to equilize the pressures acting from the bevel pinions 7 upon each of the satellites 10 due to the relative rotation between the pairs of the interconnected axles 23 carrying the respective satellites 10, said rotation being in the planes passing through rotational axis $a$ of the differential casing 24, and due to the relative shifting of said pairs along this axis.

In the embodiment where the differential is equipped with the inserts in the form of the bars 29, the operation is similar to that of the differential with bush-shaped inserts.

When the differential is made with the split inner ring 32, the equilizing of pressures acting from the bevel pinions upon the satellites is accomplished by means of shifting the wedge-shaped parts 34 under the action of the more loaded satellites. These parts 34 cause the movement of the rest of the parts 34 and 35 until the shifting forces are uniformly distributed between all the wedge-shaped parts 34, i.e., until the equilization of pressures acting from the bevel pinions 7 upon the satellites 10 is achieved.

It is to be understood to those skilled in the art that the form of this invention, herewith shown and described, is to be taken as a preferred embodiment of the bevel gear differential, and that various changes in the differential may be resorted to, without departing from the spirit of this invention or the scope of the claims below.

What is claimed is:

1. A bevel gear differential comprising: a housing; a driving rotatable differential casing accommodated in said housing; a spider having a group of axially disposed axles, said spider being accommodated in said casing to rotate therewith; bevel satellites mounted at the ends of said radially disposed axles; a pair of coaxially and concentrically disposed output shafts journalled in said housing, the inner ends of said output shafts being arranged inside said casing adjacent each other; bevel pinions each mounted on the respective ends of said output shafts and being in constant mesh with said satellites; said differential casing being provided with a ring the inner surface of the ring engaging the outer end faces of said satellites, said ring being movable in a plane normal to the rotational axis of the differential casing and prevented from shifting relative to the differential casing along the rotational axis thereof, whereby the counterbalance of the thrust acting upon the satellites and of specific pressures developed in the zone of engagement between the bevel pinions and satellites is ensured.

2. A differential according to claim 1, wherein the ring is disposed inside the differential casing, and bearing washers movable along the radially disposed axles are placed between the associated outer end faces of the satellites and said ring to provide engagement therebetween.

3. A differential according to claim 1, wherein the ring is made flexible and disposed on the outer surface of the differential casing, the engagement of said ring with the outer end faces of the satellites being accomplished through bearing washers and inserts movable along the radially disposed axles.

4. A differential according to claim 3, wherein a wedge member is placed between the ring and the differential casing, said wedge member being movable in the axial direction and adjusting the working depth of teeth in mesh of the satellites and the bevel pinions.

5. A differential according to claim 3, wherein each of the inserts comprises a parallelepiped mounted inside the differential casing and movable in the direction parallel to the rotational axis thereof, guides being made in the casing to guide said movements, the opposite radially disposed axles being in pairs rigidly interconnected while each of said pairs being angularly shiftable with respect to the other one in a plane passing through the rotational axis of the differential casing.

6. A differential according to claim 3, wherein in case if the ridially disposed axles of the spider are rigidly interconnected, each of said inserts comprises two bars disposed at the opposite sides of the respective radially disposed axles.

7. A differential according to claim 1, wherein the ring disposed inside the differential casing is made splitted and consists of wedge-shaped parts some of which engage the outer end faces of the satellites and confront them with the enlarge side thereof while the other parts of the ring are placed therebetween and have their enlarged sides adjoining the inner surface of the differential casing, those of the parts of the ring engaging the satellites being radially and angularly shiftable with respect to the differential casing along the rotational axis thereof.

8. A differential according to claim 7, wherein a screw mechanism is placed on the differential casing to adjust the working depth of teeth in mesh of the satellites with the bevel pinions, said mechanism being in contact with one of the ring parts positioned between the parts engaging the adjacent satellites.

* * * * *